United States Patent [19]
Ziv-Av

[11] Patent Number: 5,354,196
[45] Date of Patent: Oct. 11, 1994

[54] CLAMPING ASSEMBLY FOR AN INJECTION MOULDING APPARATUS

[75] Inventor: Amir Ziv-Av, Petach Tikva, Israel

[73] Assignee: Zeev Wertheimer, Nahariya, Israel

[21] Appl. No.: 12,272

[22] Filed: Feb. 1, 1993

[30] Foreign Application Priority Data

Jan. 31, 1992 [IL] Israel .................................. 100832

[51] Int. Cl.⁵ ............................................. B29C 45/64
[52] U.S. Cl. ................................... 425/589; 100/214;
100/231; 425/450.1; 425/593
[58] Field of Search ............... 425/589, 592, 593, 595,
425/450.1, 451.5, 451.6, 451.9, 541; 100/231,
214, 258 A, 281

[56] References Cited

U.S. PATENT DOCUMENTS

| 3,787,165 | 1/1974  | Fischer et al. | 425/450.1 |
| 4,222,731 | 9/1980  | Enrietti et al. | 425/451.5 |
| 4,345,893 | 8/1982  | Prince | 425/595 |
| 4,421,472 | 12/1983 | Martin, Jr. | 425/450.1 |
| 5,033,955 | 7/1991  | Faig et al. | 425/450.1 |
| 5,249,951 | 10/1993 | Leonhartsberger et al. | 425/451.9 |

FOREIGN PATENT DOCUMENTS 0311133 4/1989 European Pat. Off. .

Primary Examiner—James Mackey
Attorney, Agent, or Firm—Helfgott & Karas

[57] ABSTRACT

A clamping assembly for an injection moulding installation includes a rigid, elongated positioning structure and an elongated clamping structure. A fixed platen is rigidly coupled to the positioning structure and articulatedly coupled to a first end portion of the clamping structure. Longitudinal, axially directed sliding bearings are formed integrally with the positioning structure. The assembly further includes a movable platen slidably supported on the bearings for a free, axially directed displacement with respect to the positioning structure towards and away from the fixed platen. A platen drive unit is articulatedly coupled to a second and opposite end portion of the clamping structure and to the movable platen for imparting that displacement to the movable platen.

19 Claims, 7 Drawing Sheets

CLAMPING ASSEMBLY FOR AN INJECTION MOULDING APPARATUS

FIELD OF THE INVENTION

The present invention relates to a clamping assembly for an injection moulding apparatus.

BACKGROUND OF THE INVENTION

Injection moulding apparatus typically comprises fixed and movable load-bearing platens which are adapted to clamp between them respective halves of a two-part mould. By means of an hydraulically or mechanically operated ram, pressure is applied to the movable platen so as to clamp together the two halves of the mould into which molten plastics material is then injected at pressure which can often be very high. In order to ensure that the two sections of the mould are not displaced with respect to each other as a result of the high pressure injection of the plastics material, a high clamping force has to be applied so as to hold together the two sections of the mould.

Hitherto proposed apparatus for achieving these objectives are well known in the art and have been available for many years. Thus, for example, U.S. Pat. No. 3,128,501 (J. E. Borah) describes a power operated multiple press, the principles of which have changed little since the publication of this patent. Borah describes an apparatus which includes fixed and movable platens which are slidably supported with respect to each other by means of four corner posts or tie bars located respectively at the four corners of the two platens, such that the movable platen may slide along these posts towards and away from the fixed platen. The two halves of a mould are substantially symmetrically supported by facing surfaces of the two platens, the clamping force being directed along an axis which is substantially collinear with the axis of symmetry of the mould.

With such known structures, the presence of the four tie bars seriously limits the accessibility of the region between the platens insofar as the introduction and removal of the mould sections are concerned. This limitation is particularly troublesome when one bears in mind that the mould sections can be of significant size, complex shape and significant weight and require to be manoeuvred into position and removed therefrom using mechanical handling equipment. Furthermore, this relative inaccessibility of the clamping space seriously limits the degree of automation which could otherwise be employed in connection with the introduction and removal of the mould sections.

It is an object of the present invention to provide a new and improved clamping assembly for an injection moulding apparatus wherein the above-referred-to disadvantages are significantly reduced.

BRIEF SUMMARY OF THE INVENTION

According to the present invention, there is provided a clamping assembly for an injection moulding installation comprising:

rigid, elongated positioning and clamping structures with one of said structures substantially embracing the other;

a fixed platen rigidly coupled to said positioning structure and articulatedly coupled to a first end portion of said clamping structure;

longitudinal, axially directed sliding bearings formed integrally with said positioning member;

a movable platen slidably supported on said bearings for free, axially directed displacement with respect to said positioning structure towards and away from said fixed platen; and platen drive means articulatedly coupled to a second and opposite end of the clamping structure and to the movable platen for imparting said displacement to said movable platen.

Thus essentially the apparatus is characterized by it being divided into two separate structures, namely the positioning structure and the clamping structure.

By virtue of the fact that the fixed platen is rigidly coupled to the positioning structure whilst the movable platen is slidably supported on the positioning structure and is articulatedly coupled to the clamping structure, the reactions on the platens resulting from the forces acting thereon during moulding do not give rise to bending of the supporting structure. In consequence thereof, the relative positioning of the platens with respect to each other is maintained substantially invariant.

It is particularly to be pointed out that these distinct advantages are achieved despite the fact that the assembly is not formed with tie bars. The provision of an assembly without such tie bars leads to very distinct advantages, among which are the following:

convenient removal of parts from the moulds using robots, without having to take into account tie-bars;

convenient removal by hand of finished parts from the moulds;

convenient replacement of moulds using a standard overhead crane (with existing machines it is not always possible to place the moulds due to tie-bar hindrance);

reduction of geometrical limitations to mould support systems (hydraulic pistons, etc.).

Furthermore, and in addition to the above, the assembly frame will be more rigid than existing frames, rendering installation in the customer's premises easier and simpler. The proposed assembly is less sensitive than existing machines to the nature of the base surface on which it is to be mounted.

BRIEF SUMMARY OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
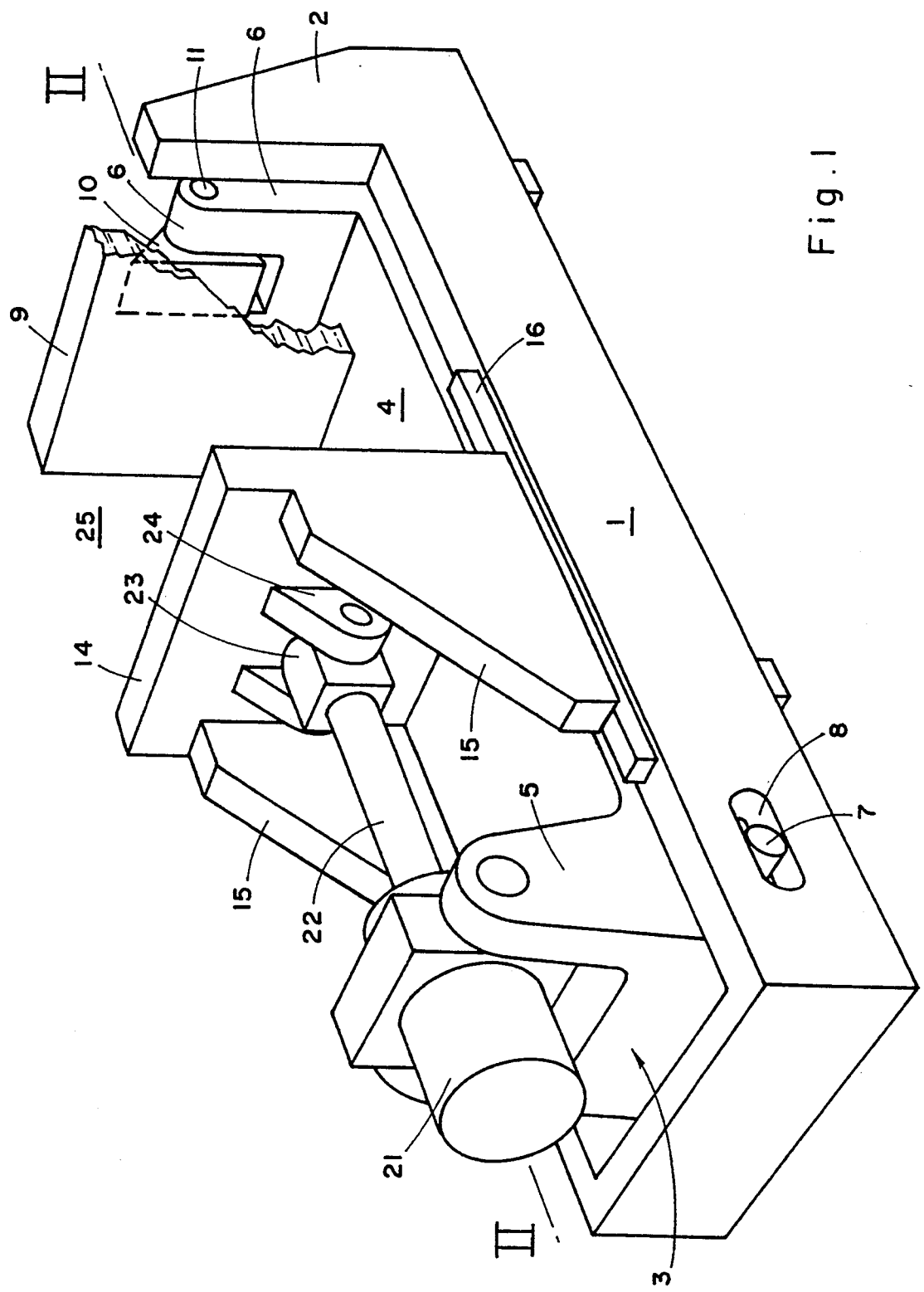
FIG. 1 is a schematic perspective view of one embodiment of a clamping installation in accordance with the invention.
Figure 2:
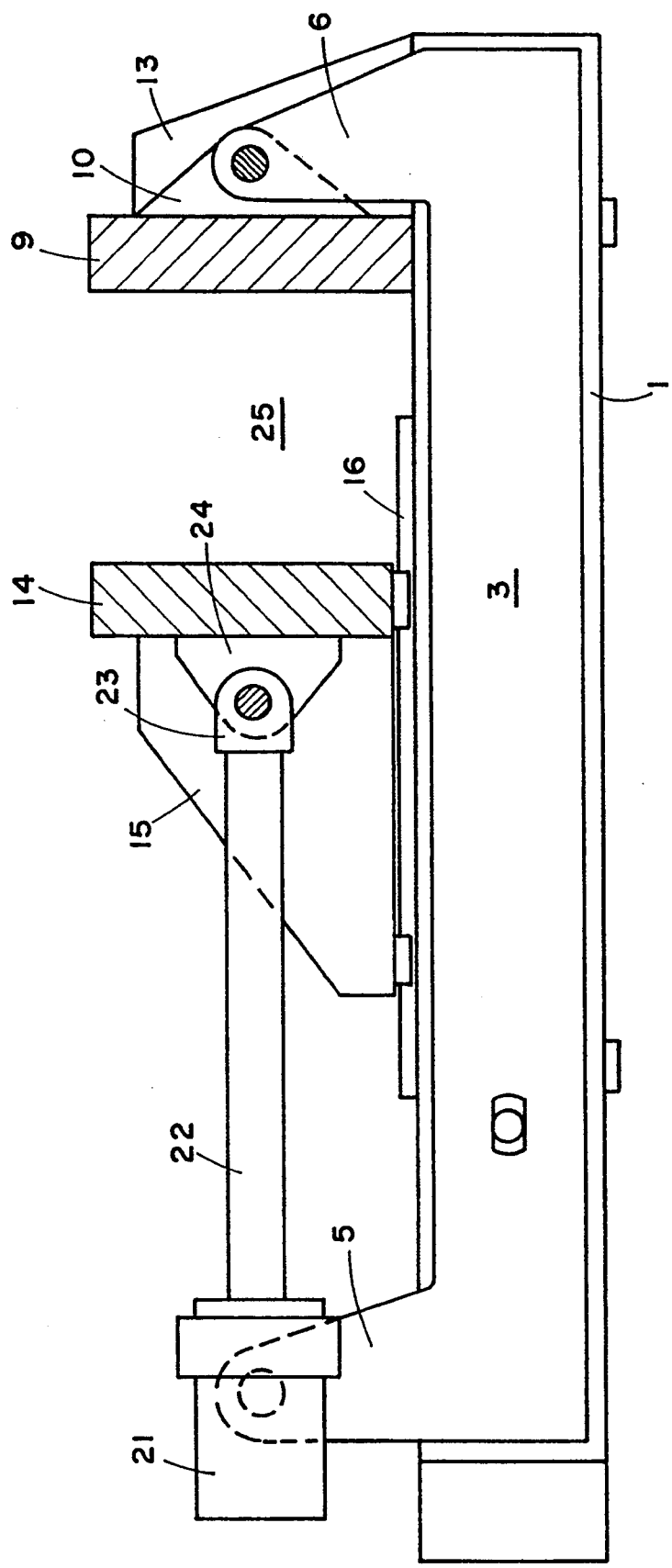
FIG. 2 is a longitudinally sectioned view of the installation shown in FIG. 1, taken along the line II—II.

As seen in FIGS. 1 and 2 of the drawings, a clamping assembly for an injection moulding installation comprises a rigid, elongated, rectangular base frame 1 constituting a positioning structure having, at one end thereof, a pair of upwardly extending support posts 2. An elongated, substantially rectangular clamping structure 3 nests within the base frame 1 and comprises an elongated planar base portion 4 and, at either end thereof, pairs of bearing posts 5 and 6. The end of the clamping structure 3 adjacent the support posts 5 is formed with a pair of laterally extending support pins 7 which extend through a pair of longitudinally extending slots 8 formed in the base frame 1 so that the structure 3 is supported on the base frame 1 and is capable of limited longitudinal displacement with respect thereto.

A fixed platen 9 is formed integrally with the support posts 2 and with a rearwardly extending lug 10. The latter is located between the support posts 6 and is pivotally mounted with respect thereto by means of an axle 11.

A movable platen 14 is formed with a pair of rearwardly extending struts 15, the under edges of which rest on elongated ribs 16 integral with an upper edge of the base frame 1. These under edges of the struts 15, together with the ribs 16, constitute sliding contact bearings.

A hydraulic drive piston 21 is pivotally mounted between the posts 5 and has extending therefrom a piston drive rod 22 which terminates in a head portion 23 which is pivotally mounted to and between a pair of rearwardly extending lugs 24 formed integrally with a rear surface of the movable platen 14.

The region between the fixed and movable platens 9, 14 constitutes an effective clamping region 25. The object to be clamped, such as a two-piece mould (not shown), is located in the clamping region 25 and the hydraulic piston 21 drives the movable platen 14 towards the object and exerts sufficient pressure on the object so as to maintain it effectively and securely clamped.

It will be seen that whilst the fixed platen 9 is formed integrally with the base frame 1, the movable platen merely rests on the base frame 1 (and is therefore capable of linear translational displacement with respect thereto). On the other hand, such translational displacement of the movable platen, as a reaction to the forces acting thereon consequent upon clamping of the object, is resisted by the coupling of the movable platen 14, via the hydraulic piston 21, to the support structure 3. In consequence, this reaction does not give rise to any distortion (due to bending or the like) in the base frame 1 and the relative disposition of the fixed and movable platens remains substantially invariant. Any bending stresses acting on the clamping structure 3 merely results in a certain degree of bending of the latter without in any way affecting the basic spacing between the platens. In point of fact, the bending stresses induced in the clamping structure 3 are transmitted via the pivotal coupling of the latter to the fixed platen 9 so as to ensure its even firmer clamping of the object against the movable platen 14.

Figure 3:
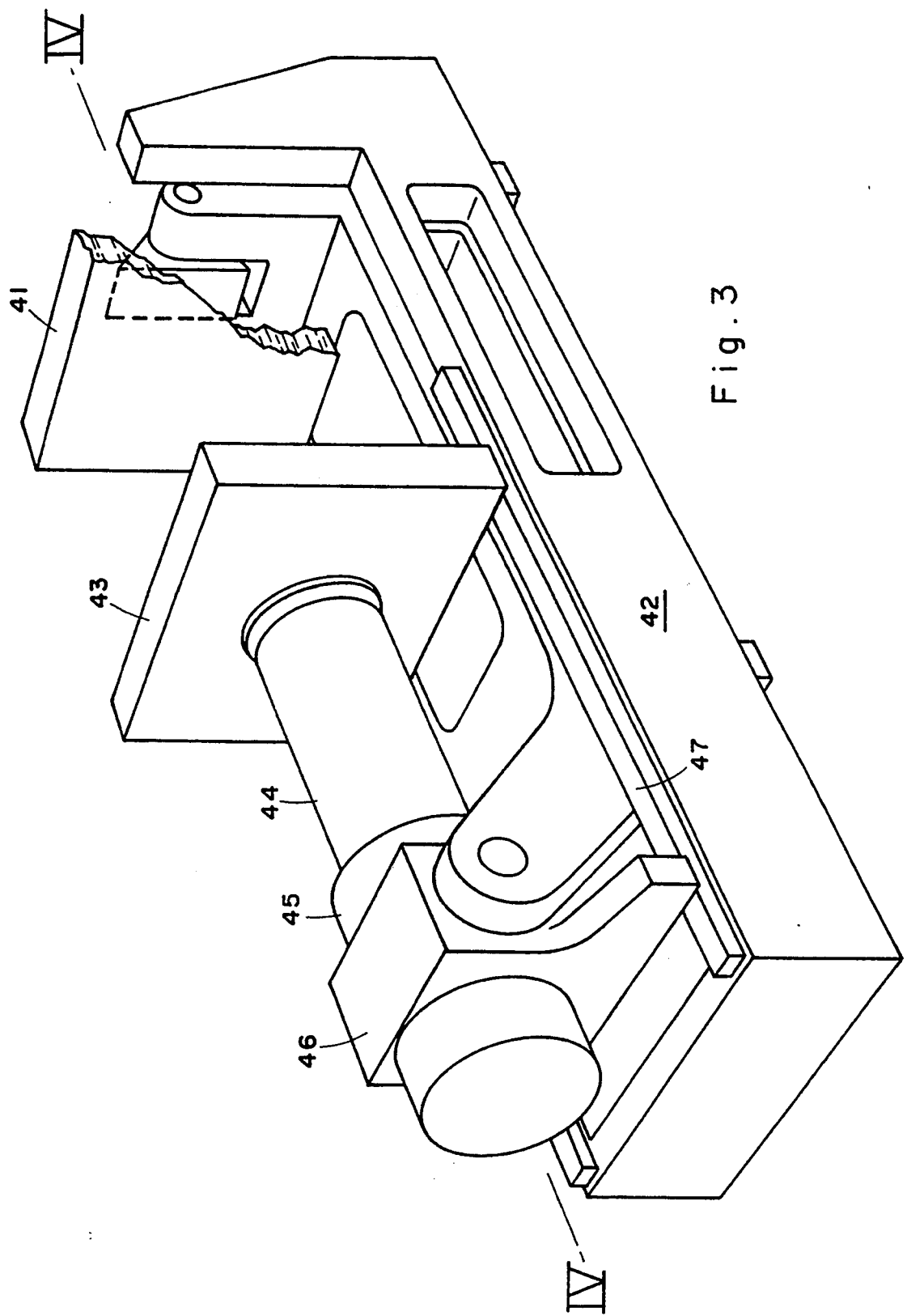
FIG. 3 is a schematic perspective view of a further embodiment of the installation in accordance with the invention.
Figure 4:
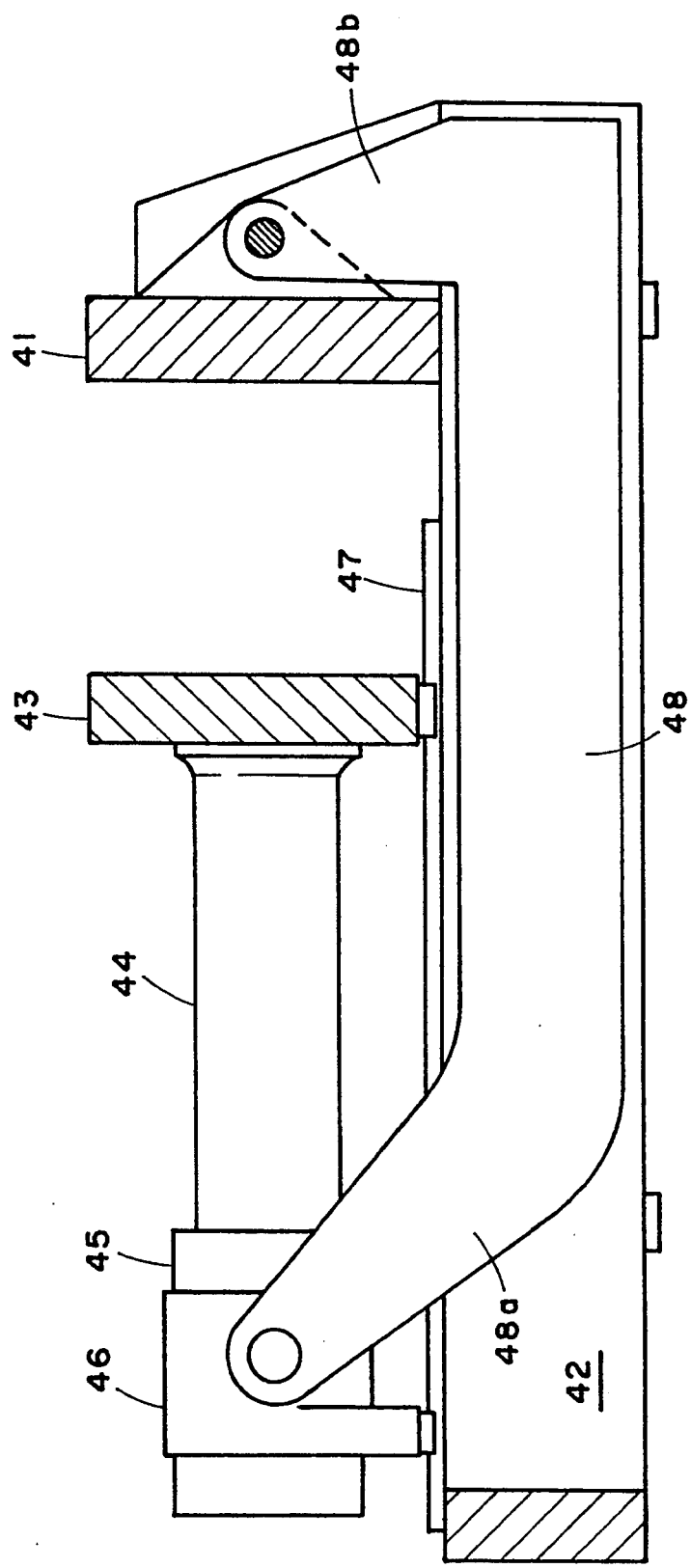
FIG. 4 is a longitudinal view of the installation shown in FIG. 3, taken along the line IV—IV.

In an alternative embodiment shown in FIGS. 3 and 4 of the drawings, the clamping assembly is provided with a fixed platen 41 which is formed integrally with a rigid, elongated rectangular base frame 42 constituting a positioning structure. A movable platen 43 is rigidly coupled to a piston drive rod 44 of a hydraulic drive piston 45. The drive piston 45 is held in a piston mounting bracket 46. Both the movable platen 43 and the bracket 46 are slidably supported on the upper surfaces of elongated ribs 47, the undersurfaces of the movable platen 43 and the bracket 46, together with the upper surfaces of the ribs 47, constituting sliding contact bearings.

A pair of clamping arms 48 (only one being seen) extends longitudinally within the rectangular base frame 42 and adjacent a pair of longitudinal sides thereof. One adjacent pair of upturned end portions 48a of the clamping arms 48 are respectively and pivotally coupled to opposite sides of the mounting bracket 46 whilst an opposite pair of adjacent upturned ends 48b of the clamping arms 48 are pivotally coupled to the fixed platen 41.

In this embodiment, the movable platen 43 and the hydraulic drive piston 45 form a unit which rests on the positioning structure (the movable platen 43 being longitudinally slidable with respect to the positioning structure. As in the previously described embodiment, the reaction on the fixed and movable platens 41 and 43 as a result of clamping pressure being exerted on the clamped object does not result in any distortion of the positioning structure but, if anything, results in a slight bending of the clamping arms 48. This does not, of course, affect spacing between the platens 41 and 43 but merely results in the fixed platen 41 being more firmly pressed against the clamped object.

Figure 5:
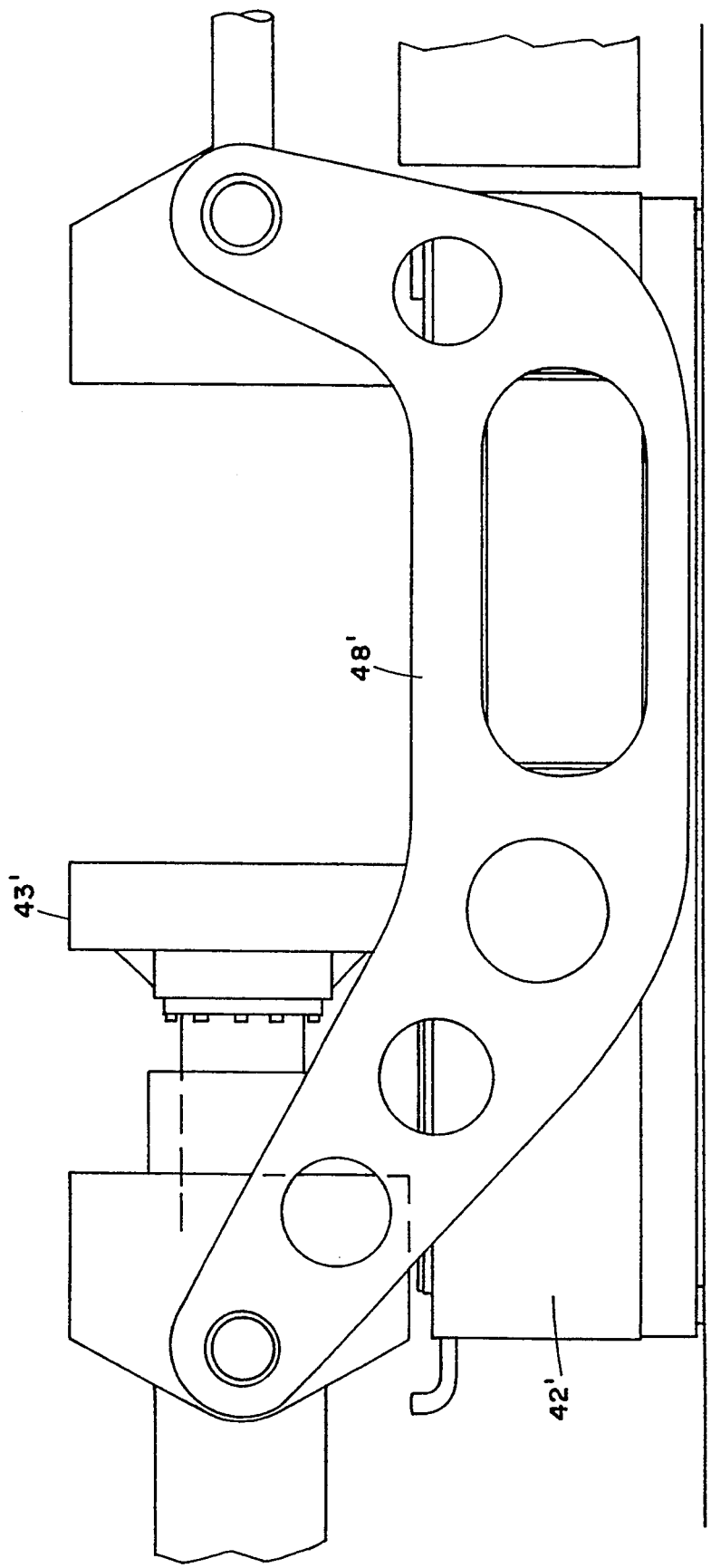
FIG. 5 is a side elevation of a still further embodiment of the installation in accordance with the invention.

In a still further embodiment, as shown in FIG. 5 of the drawings, the clamping assembly is essentially similar to that described with reference to FIGS. 3 and 4, with the sole exception that, whereas in the assembly shown in FIGS. 3 and 4 the clamping arms 48 (i.e. the clamping structure) are located within the rectangular base frame 42 (i.e. the positioning structure), in the assembly shown in FIG. 5 of the drawings, the clamping arms 48' are located outside the base frame 42' and respectively adjacent the outside longitudinal sides thereof. In this way, the entire region between the platens and within the base frame 42' remains unencumbered by the clamping structure.

Figure 6:
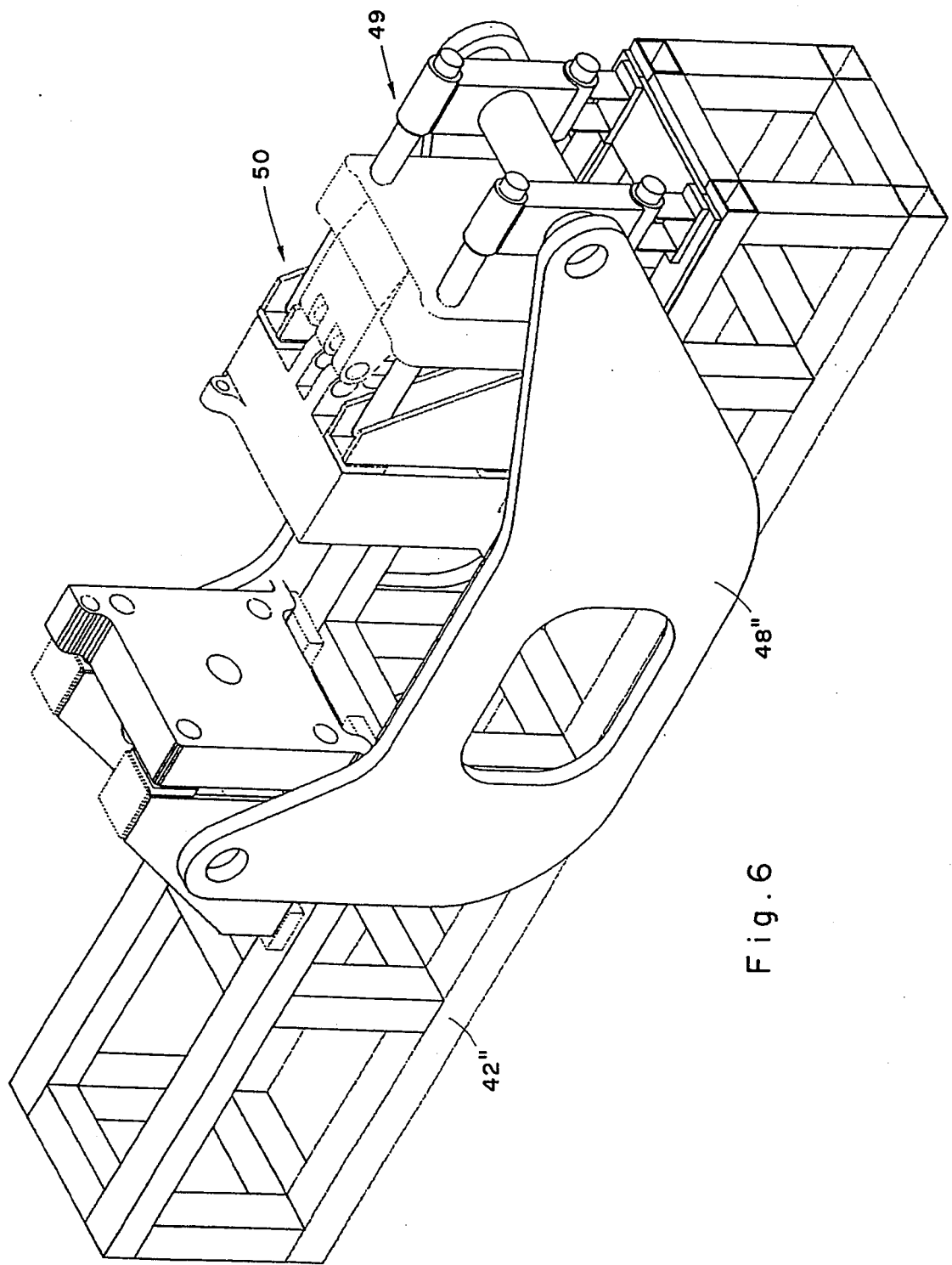
FIG. 6 is a schematic perspective view of a portion of a still further embodiment of the installation in accordance with the invention.

FIG. 6 of the drawings illustrates a clamping assembly of the kind illustrated in FIG. 5 of the drawings, namely one wherein clamping arms 48" are located outside a base frame 42", but in this case a movable platen 43'is coupled to a hydraulic drive system 49 via a toggle lever assembly 50. The drive system 49 is used to activate the toggle assembly to displace the movable platen 43'. The toggle assembly 50 serves as a positive stop and pressure holding device during injection. This type of assembly responds very quickly to opening and closing displacements of the movable platen 43'.

The clamping assemblies in accordance with the invention, as described with reference to the drawings, are capable of operating with high clamping pressures without introducing any distortions in the clamping region. It will be readily seen that with such an assembly wherein the fixed and movable platens are not associated with tie bars, the clamping region is readily accessible for the ready introduction and removal of the mould and for the mechanical handling thereof.

Figure 7:
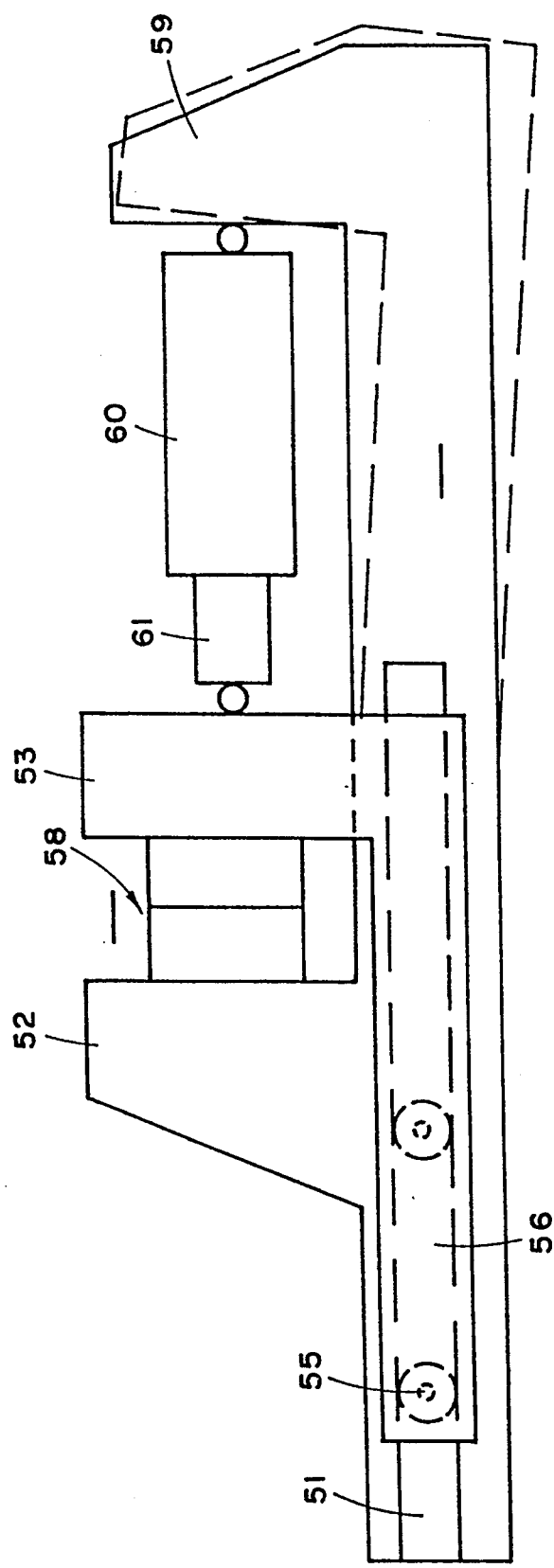
FIG. 7 is a schematic side elevation of an embodiment of a clamping assembly in accordance with a further aspect of the invention.

In an embodiment of a clamping assembly in accordance with a further aspect of the invention, as shown in FIG. 7 of the drawings, the assembly includes a base frame 51 having an integrally formed fixed platen 52 and a movable platen 53. The latter has integrally formed, longitudinally extending support limbs 54 between which are mounted sliding rollers 55 which slide in a longitudinally extending slot 56 formed in the base frame 51, the rollers 55 and slot 56 constituting together sliding contact bearings. The region between the platens 52 and 53 constitutes a clamping region 57, in which is shown located a two-piece mould 58. Formed integrally with the end of the base frame 51 closest the movable platen 53 is a support post 59 which has pivotally mounted thereon a hydraulic piston 60 whose drive rod 61 is pivotally coupled to the movable platen 53.

The sliding contact bearings, constituted by the rollers 55 and the slot 56, are substantially located outside the clamping region 57 and, in consequence, when clamping pressure is applied to the movable platen 53 by the drive rod 61, the counteracting forces acting on the base frame 51 via the support post 59 leads to the bending distortion of that portion of the base frame 51 outside the clamping region 57 without affecting the clamping region itself.

Whilst in the specific embodiments described above the coupling of the fixed platen to the base frame, as well as the coupling of the drive rod to the movable platen, have been by way of pivotal couplings, it will be appreciated that other forms of coupling can be employed which, while transmitting axially directed forces, nevertheless allow for a limited degree of relative tilting motion between the coupled components.

I claim:

1. A clamping assembly for an injection moulding installation comprising:
    a rigid, elongated positioning structure and a rigid elongated clamping structure with one of said structures substantially embracing another of said structures;
    a fixed platen rigidly coupled to said positioning structure and articulatedly coupled to a first end portion of said clamping structure;
    longitudinal, axially directed sliding bearings formed integrally with said positioning structure;
    a movable platen slidably supported on said bearings for free, axially directed displacement with respect to said positioning structure towards and away from said fixed platen; and
    platen drive means articulatedly coupled to a second end portion of the clamping structure, opposite to said first end portion, and to the movable platen for imparting said displacement to said movable platen.

2. A clamping assembly according to claim 1, wherein said platen drive means comprises an hydraulic drive system having a drive piston coupled to said movable platen.

3. A clamping assembly according to claim 2, wherein said drive piston is formed with a piston rod articulatedly coupled to said movable platen.

4. A clamping assembly according to claim 3, wherein said drive piston rod is pivotally coupled to said movable platen.

5. A clamping assembly according to claim 2, wherein said drive piston comprises a piston rod rigidly coupled to said movable platen and a piston housing supported on said positioning structure and capable of limited longitudinal displacement with respect thereto.

6. A clamping assembly according to claim 2, wherein said drive piston comprises a piston rod coupled to said movable platen via a toggle system and a piston housing supported on said positioning structure.

7. A clamping assembly according to claim 1, wherein said clamping structure is pivotally coupled at said opposite end portion thereof respectively to said fixed platen and to said platen drive means.

8. A clamping assembly according to claim 1, wherein said clamping structure substantially embraces said positioning structure.

9. A clamping assembly according to claim 8, wherein said positioning structure comprises an elongated support frame of substantially rectangular cross-sectional shape and wherein said clamping structure comprises a pair of elongated clamping arms respectively located on either side of said positioning structure, one pair of adjacent ends of said arms being pivotally coupled to said fixed platen, an opposite pair of adjacent ends of said arms being pivotally coupled to said platen drive means.

10. A clamping assembly according to claim 1, wherein said positioning structure substantially embraces said clamping structure.

11. A clamping assembly for an injection moulding installation, comprising:
    a rigid elongated positioning structure and a rigid elongated clamping structure, one of said structures embracing another of said structures;
    a fixed platen rigidly coupled to said positioning structure and articulatedly coupled to a first end portion of said clamping structure;
    longitudinal, axially directed sliding bearings formed integrally with said positioning structure;
    a movable platen slidably supported on said bearings for free, axially directed displacement with respect to said positioning structure towards and away from said fixed platen; and
    platen drive means coupled to a second end portion of the clamping structure, opposite to said first end portion, and to the movable platen for imparting said displacement to said movable platen.

12. A clamping assembly according to claim 11, wherein said platen drive means comprises an hydraulic drive system having a drive piston coupled to said movable platen.

13. A clamping assembly according to claim 12, wherein said drive piston is formed with a piston rod articulatedly coupled to said movable platen.

14. A clamping assembly according to claim 13, wherein said drive piston rod is pivotally coupled to said movable platen.

15. A clamping assembly according to claim 12, wherein said drive piston comprises a piston rod rigidly coupled to said movable platen and a piston housing supported on said positioning structure and capable of limited longitudinal displacement with respect thereto.

16. A clamping assembly according to claim 12, wherein said drive piston comprises a piston rod articulately coupled to said movable platen and a piston housing supported on said positioning structure and capable of limited longitudinal displacement with respect thereto.

17. A clamping assembly according to claim 12, wherein said drive piston comprises a piston rod coupled to said movable platen via a toggle system and a piston housing supported on said positioning structure.

18. A clamping assembly according to claim 11, wherein said clamping structure substantially embraces said positioning structure.

19. A clamping assembly according to claim 11, wherein said positioning structure substantially embraces said clamping structure.

* * * * *